United States Patent
Mielenz et al.

(10) Patent No.: US 8,365,269 B2
(45) Date of Patent: Jan. 29, 2013

(54) EMBEDDED COMMUNICATION TERMINAL

(75) Inventors: Carsten Mielenz, Landsberg (DE); Hans-Georg Gruber, Chandler, AZ (US)

(73) Assignee: Intel Mobile Communications GmbH, Neubiberg (DE)

(*) Notice: Subject to any disclaimer, the term of this patent is extended or adjusted under 35 U.S.C. 154(b) by 1182 days.

(21) Appl. No.: 11/432,712

(22) Filed: May 11, 2006

(65) Prior Publication Data

US 2007/0011727 A1 Jan. 11, 2007

(30) Foreign Application Priority Data

May 11, 2005 (DE) .......................... 10 2005 021 849

(51) Int. Cl.
*G06F 17/00* (2006.01)

(52) U.S. Cl. ............ 726/11; 726/12; 713/153; 380/251; 380/279

(58) Field of Classification Search ............... 726/11–12; 713/153; 709/238; 380/270, 251, 279
See application file for complete search history.

(56) References Cited

U.S. PATENT DOCUMENTS

| 6,601,086 | B1 | 7/2003 | Howard et al. |
| 7,370,194 | B2* | 5/2008 | Morais et al. .................. 713/153 |
| 2004/0150519 | A1* | 8/2004 | Husain et al. .................. 340/506 |
| 2004/0203976 | A1 | 10/2004 | Gupta et al. |
| 2004/0204028 | A1 | 10/2004 | Kotzin |
| 2004/0204102 | A1 | 10/2004 | Kuehnel et al. |
| 2005/0078620 | A1* | 4/2005 | Balachandran et al. ....... 370/313 |
| 2006/0129848 | A1* | 6/2006 | Paksoy et al. .................. 713/193 |

FOREIGN PATENT DOCUMENTS

WO  WO 2005/041601 A1  5/2005

* cited by examiner

*Primary Examiner* — Thanhnga B Truong
(74) *Attorney, Agent, or Firm* — Dickstein Shapiro LLP

(57) ABSTRACT

An embedded communication terminal equipped with an interface device which performs security tasks, driver tasks, power management tasks and handover tasks, and thus relieves the application processor of the embedded communication terminal.

17 Claims, 4 Drawing Sheets

EMBEDDED COMMUNICATION TERMINAL

CROSS-REFERENCE TO RELATED APPLICATION

This application claims priority to German Patent Application Serial No. 10 2005 021 849.0-31, which was filed on May 11, 2005, and is incorporated herein by reference in its entirety.

FIELD OF THE INVENTION

The invention relates to an embedded communication terminal.

BACKGROUND OF THE INVENTION

In modern communication technology, radio modules, for example according to the GSM (Global System for Mobile Communications) standard or according to WLAN (Wireless Local Area Network) are coupled with application processors, implementing security functions such as, for example, DRM (Digital Rights Management), handover functions, power management functions and functions for exchanging data. Furthermore, so-called embedded systems are coupled to one another, also providing security functions, handover functions, power management functions and functions for exchanging data.

In such arrangements, radio modules or embedded systems convey different data having different bandwidths to application processors. For example, different radio modules can be coupled by means of a bus according to the HML standard so that the MIPI (Mobile Industry Processor Interface) standard is met.

Coupling different radio modules and embedded systems should be possible flexibly and reliably (anywhere, anyhow, anytime), taking into consideration the power management, security aspects and operating system questions during the communication of the units involved. Furthermore, shared resources must be suitably allocated.

FIG. 1 shows a common arrangement 100. A multiplicity of radio modules 101 and a multiplicity of mobile devices 102 is coupled to a multiplicity of application processors 103.

The coupling is based, for example, on SIP (Session Initiation Protocol), or ENUM (E-number or telephone number mapping, respectively) and JINI. In this arrangement, handover functions, autoauthentification function and, for example "chaos-based") security functions are provided. The functions are initialized, for example during the booting.

FIG. 2 shows an example of a coupling of application processors.

A first processor 201 is coupled to a first interrupt unit (VIC—vectored interrupt controller) 202. A second processor 203 is coupled to a second interrupt unit 204. The first interrupt unit 202 and the second interrupt unit 204 are supplied with interrupt requests by means of a first interrupt signal line 205 from shared I/O interrupt sources. Furthermore, the first processor 201 is coupled to the second interrupt unit 204 by means of a second interrupt signal line 206 so that the first processor 201 can supply interrupt requests to the second interrupt unit 204. Analogously, the second processor 203 can supply interrupt requests to the first interrupt unit 202 by means of a third interrupt signal line 207.

The first processor 201 and the second processor 203 are, for example, application processors of different embedded systems, digital signal processors or, for example, ARM (Acorn Risc Machine) cores.

SUMMARY OF THE INVENTION

An embedded communication terminal comprises an application processor, a communication device and an interface device. The interface device has an interface processor and an interface memory, and is coupled to the application processor and the communication device. The communication device sends data from the embedded communication terminal and receives, and forwards to the interface device, data sent to the embedded communication terminal. The interface device by means of the interface memory temporarily stores, or by means of the interface processor processes, and forwards to the application processor, data received by the communication device. The interface device by means of the interface memory temporarily stores, or by means of the interface processor processes, and forwards to the communication device for sending, data to be sent by the embedded communication terminal.

DETAILED DESCRIPTION OF THE INVENTION

Figure 1:
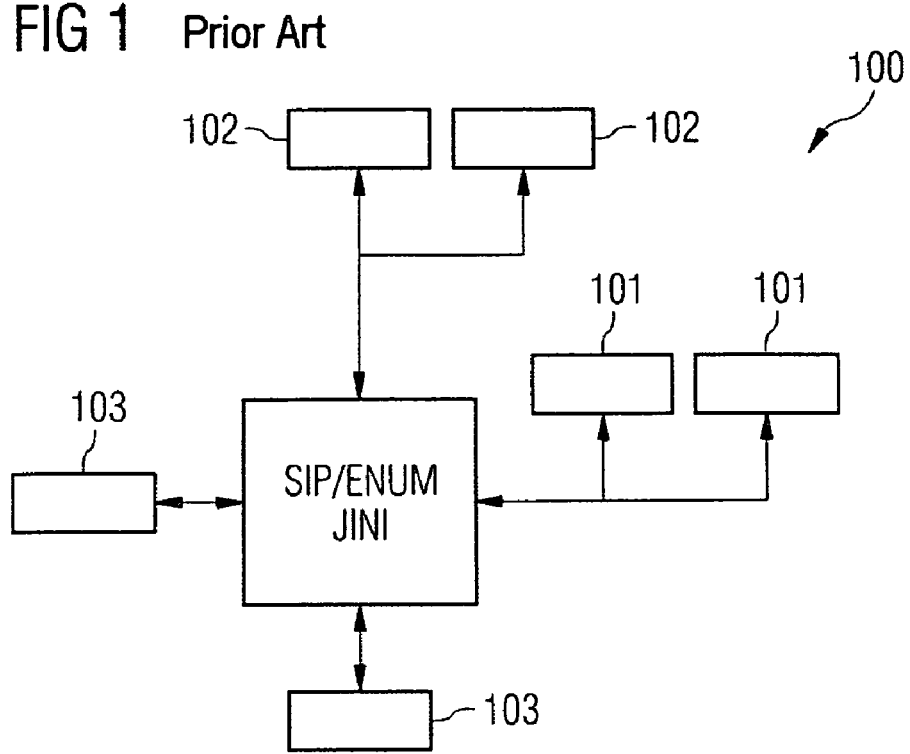
FIG. 1 shows an conventional arrangement.
Figure 2:
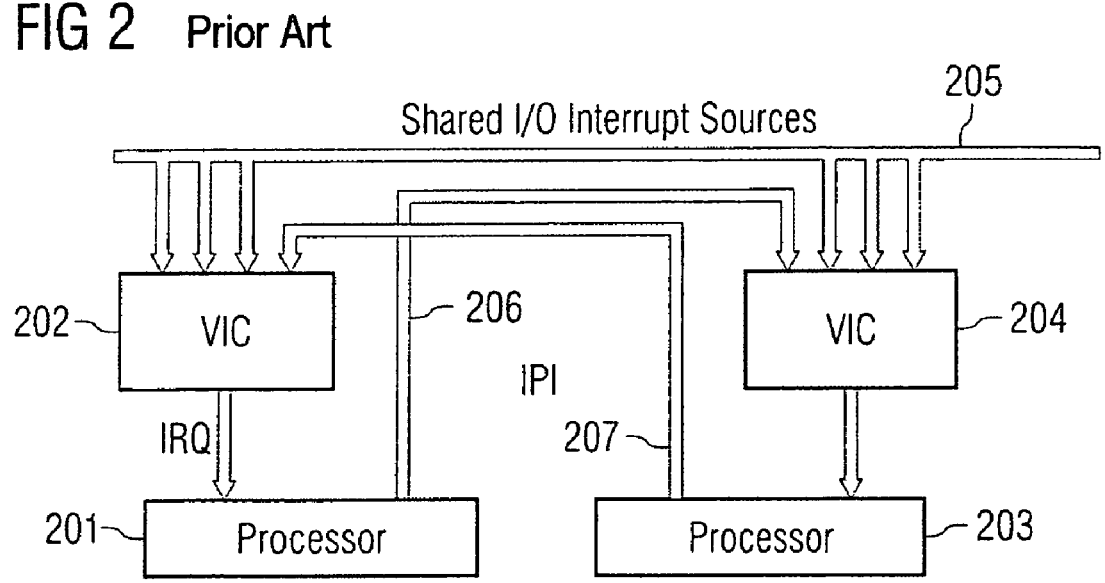
FIG. 2 shows an example of a conventional coupling of application processors.

Illustratively, the interface device, designated as Central Link Shield (CLS) in the context of the illustrative embodiments described below, has the functionality of a gateway for the embedded communication terminal. A concept forming the basis of the invention can be seen in that an interface device, which relieves the application processor from many tasks relating to the data communication of the embedded communication terminal (illustratively with the outside world), is provided for the application processor (in the same housing).

Thus, for example, the interface device handles tasks relating to power management or handover, provides security functionalities or DRM (Digital Rights Management) and performs system synchronization tasks, for example in the case where a number of embedded communication terminals are coupled to one another.

In particular, the interface device regulates the communication of the application processor with the outside world (that is to say units which are not part of the embedded communication terminal) in accordance with rules which are stored, for example, by means of the interface memory. Illustratively, the interface device shields the application processor against the outside. Thus, the application processor no longer needs to be separately protected.

In one embodiment, the entire communication of the application processor with external communication partners, that is to say units which are not part of the embedded communication terminal, is carried out by means of the interface device. In particular, the communication of the application processor with communication modules which enable communication with external units, for example with a modem of the embedded communication terminal or with a radio module of the embedded communication terminal for communication with a mobile radio communication network, is carried out by means of the interface device.

The interface device can enable the application processor to communicate with the outside world in accordance with a multiplicity of protocols. Illustratively, the interface device has a driver functionality. Thus, embedded communication terminals can be flexibly and reliably coupled to one another by use of the invention.

The embedded communication terminal is, for example, a mobile radio subscriber unit. In this case, the mobile radio subscriber unit can flexibly exchange audio data (e.g. voice data) with the outside world.

In one embodiment, the interface device is simple to configure by supporting, for example, software plug-ins.

In one embodiment, the interface device is temporarily storing, by means of the interface memory, and processing by means of the interface processor, and forwarding to the application processor, data received by the communication device.

In one embodiment, the interface device is further temporarily storing, by means of the interface memory, and processing by means of the interface processor and forwarding to the communication device for sending, data to be sent by the embedded communication terminal.

In one embodiment, the interface device is decrypting, and forwarding to the application processor, encrypted data received by the communication device.

The interface device can thus relieve the application processor with regard to the decryption of encrypted data, for example, e-mails encrypted by means of PGP (pretty good privacy).

The interface device can also be encrypting, and forwarding to the communication device for sending, data to be sent encrypted by the embedded communication terminal.

This achieves further relief of the application processor since the interface device illustratively handles secure data transmission and the application processor can supply data unencrypted directly to the interface device for sending.

In one embodiment, the interface device is storing data and, on a request for the data which is transmitted to the embedded communication terminal and received by the communication device, sending the data by means of the communication device in accordance with the request.

For example, information about the configuration of the embedded system (operating system used, programs installed) can be stored in the interface memory which, at a corresponding request by a server computer which is external (with respect to the embedded communication terminal), is sent to the server computer so that the server computer, for example, data in a suitable format to the embedded communication terminal. For example, the server computer is informed that the embedded communication terminal can only process and display video data in a certain format so that the server computer correspondingly can provide video data in a suitable format.

In one embodiment, the embedded communication terminal is having at least one further communication device and the interface device is enabling sending and receiving by means of the communication device and the at least one further communication device.

Illustratively, the interface device provides communication to the application processor in accordance with a number of protocols and communication techniques such as, for example, UMTS (Universal Mobile Telecommunication System) and WLAN (Wireless Local Area Network), and thus has the functionality of a driver.

Furthermore, the interface device is performing power management tasks and/or handover tasks.

In one embodiment, the embedded communication terminal is a mobile radio subscriber unit.

In one embodiment, the interface device is also performing power management tasks and handover tasks.

According to another aspect of the invention, an embedded communication terminal is provided, comprising an application processor, a communication device and an interface device. The interface device is having an interface processor and an interface memory and is being coupled to the application processor and the communication device. The communication device is sending data from the embedded communication terminal and receiving, and forwarding data sent to the embedded communication terminal to the interface device. The interface device is storing or processing and forwarding to the application processor, data received by the communication device and the interface device is storing or processing and forwarding to the communication device for sending, data to be sent by the embedded communication terminal. The application processor is being shielded against units outside the embedded communication terminal.

According to a further aspect of the invention, An embedded communication terminal is provided, comprising an application processor, a communication device and an interface device. The interface device is shielding the application processor with regard to the entire communication of the application processor with an embedded communication terminal external device.

Illustrative embodiments of the invention are represented in the figures and will be explained in greater detail in the text which follows.

Figure 3:
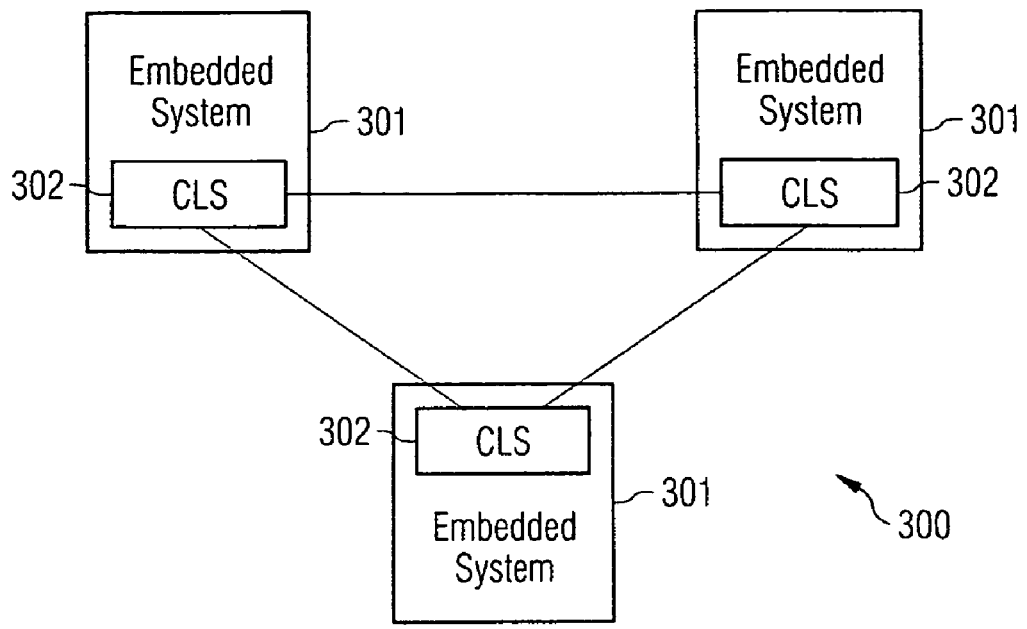
FIG. 3 shows an arrangement according to an illustrative embodiment of the invention.

FIG. 3 shows an arrangement 300 according to an illustrative embodiment of the invention.

A multiplicity of embedded systems (embedded communication terminals) 301 is coupled to one another in the arrangement 300. Each embedded system 301 has a central link shield 302. The coupling of the embedded systems 301 is effected by means of the central link shields 302. The embedded systems can be coupled via fixed lines, for example as LAN (Local Area Network) according to Ethernet or by means of radio communication links, for example according to GSM (Global System for Mobile Communications), WLAN (Wireless Local Area Network), DVB-H (Digital Video Broadcast—Handheld) or Bluetooth. In accordance with the coupling of the embedded systems, each of the central link shields 302 is equipped with a corresponding radio module, for example with a modem or a WLAN radio module. The exact configuration of an embedded system 301 and the operation of the corresponding central link shield 302 will be explained exactly with reference to FIG. 4 in the text which follows.

Figure 4:
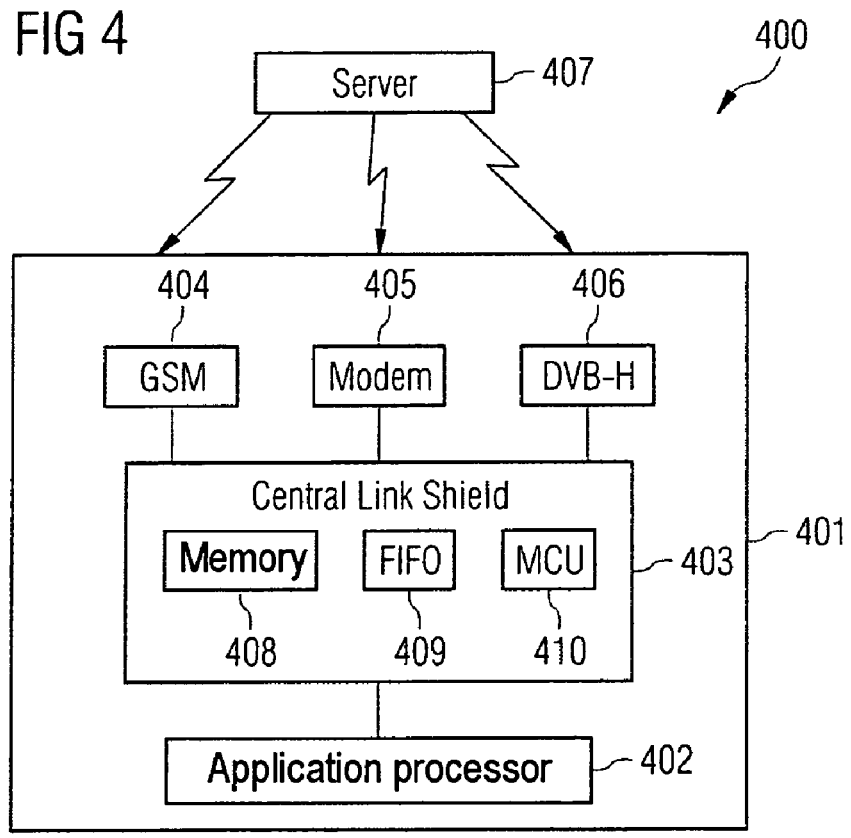
FIG. 4 shows a communication arrangement according to an illustrative embodiment of the invention.

FIG. 4 shows a communication arrangement 400 according to an illustrative embodiment of the invention.

An embedded system (embedded communication terminal) 401 has an application processor 402, a central link shield 403 and a number of communication modules 404, 405, 406, a GSM radio module 404, a modem 405 and a DVB-H receiving module 406 in the present illustrative embodiment. Analogously, the embedded system 401 can also have for example, Bluetooth radio modules, WLAN radio modules etc. The application processor 402 is coupled to the communication modules 404, 405, 406 by means of the central link shield 403.

The embedded system is coupled to a server unit 407 by means of one of the communication modules 404, 405, 406. The server unit 407 is, for example, as shown in FIG. 3, a further embedded system or also a server computer which, for example, can communicate with the GSM radio module 404 by means of a GSM base station. The coupling between the embedded system 401 and the server unit 407 is unidirectional or bidirectional depending on the communication module 404, 405, 406 used, for example, data can be transmitted only to the DVB-H radio module 406 from the server unit 407 but not in the opposite direction. To transmit data from the embedded system 401 to the server unit 407, the GSM radio module 404 is used, for example. As an alternative to GSM, other mobile radio communication systems can also be used for communication, for example mobile radio communication systems according to the UMTS (Universal Mobile Telecommunication System) standard, the GPRS (General Packet Radio Service) standard or the EDGE (Enhanced Datarate for GSM Evolution) standard. Available communication systems by means of which a communication link from the embedded system 401 to the server unit 407 (or to other server units) is possible are automatically detected by the central link shield 403 and an automatic authentication is carried out, for example by using methods based on metadata or JINI.

The central link shield 403 also performs dynamic power management and dynamic security management and dynamically detects the operating system used on the embedded system 401 (e.g. an OOS—Open Operating System). The functionality of the central link shield 403 can be used not only by the embedded system 401, but also by other embedded systems or devices which do not themselves have a central link shield but are coupled to the embedded system 401 (Shared Working Place). Using the central link shield 403, communication links and computer buses of various standards can be implemented.

The central link shield 403 has an internal memory 408, a FIFO (first in first out) memory 409 and a programmable processor 410, for example an MCU (Micro Controlling Unit). Using the memory 408 and the processor 410, the central link shield 403 provides for the application processor 402 driver functions which enable the application processor 402 to communicate with the server unit 407. Furthermore, the central link shield 403 handles security tasks, for example it can handle various security standards such as, for example, ARM Trusted zone, INTC (Intel Cooperation) Secured Core, TPM (Trusted Platform Module) and security concepts of the TCG (Trusted Computing Group). To provide reliable data transmission, the central link shield 403 supports, for example, PKI (Public Key Infrastructure) and PGP (Pretty Good Privacy). The memory 408 has a configuration register which enables the central link shield 403 to be configured.

As mentioned, the central link shield 403 provides the application processor 402 with driver functionalities. For this purpose, the central link shield 403 has a protocol suite which enables the application processor 402 to remain isolated from the protocol stacks used for the respective communication link. According to the protocol stack, the data link for the communication link is provided in accordance with the various protocol layers, for example controlling the units of the physical layer, the logical link management (LLC), the connection management, the channel access etc.

If, for example, the application processor 402 wishes to transmit an e-mail to the server unit 407 (for example, the server unit 407 is an e-mail server), the central link shield 403 can be used for temporarily storing the e-mail to be sent by means of the memory 408 until it has been transmitted to the server unit 407 by means of a corresponding communication link. For example, the application processor 402 can transmit the e-mail to the central link shield 403 within a short time and is not involved in the further process of sending the e-mail and can carry out further tasks. If the e-mail is to be encrypted before being transmitted to the server unit 407, the application processor 402 can do this itself. To further relieve the application processor 402, the central link shield 403 can receive the unencrypted e-mail as part of the security tasks from the application processor 402, encrypt it (for example according to PGP) and transmit it to the server unit 407 by means of one of the communication modules 404, 405, 406. For this purpose, the central link shield has, for example, a suitable hardware circuit or an intelligent secure block.

Furthermore, the memory 408 can be used for storing information specific to the embedded system 401. For example, information about the compatibility of the embedded system 401, for example what data can be processed by the embedded system 401 or what multimediacodecs are installed in the embedded system 401, are stored in the memory 408. Furthermore, the memory 408 can be used for storing a user history, for example which websites have been visited recently by means of the embedded system 401 by the user of the embedded system 401.

Furthermore, updates, for example user updates performed on the embedded system 401 such as, for example, updates of a telephone directory stored in the embedded system 401 or a calendar stored in the embedded system 401, can be stored directly in the memory 408 after having been transmitted from the server unit 407 to the embedded system 401. This results in further relief of the application processor 402 or of the memory used by the application processor 402, respectively, since, for example, the user history is no longer stored by means of the application processor 402 (and thus computing time is used up) but directly by means of the memory 408 of the central link shield 403.

The memory 408 can also be used for storing API (Application Programmers Interface) structures which are specific to the operating system of the embedded system 401. These API structures can thus be provided directly to the server unit 407 without the application processor 402 having to be involved.

If, for example, a multimediacodec installed in the embedded system 401 is to be updated, assuming that the update data are transmitted from the server unit 407 to the embedded system 401, the update data can be temporarily stored by means of the memory 408 (and only partially in one embodiment). The central link shield 403 then informs the application processor about the update and the central link shield 403 itself checks the update data (for example for integrity).

The memory 408 of the central link shield 403 is protected, for example, by means of a suitable security mechanism. Illustratively, the central link shield 403 isolates the application on the client side and communicates with the operating system of the embedded system 401 and can inform the application processor 402, for example by means of the operating system, as soon as the update is concluded. In particular, the application processor does not need to interrogate periodically as to whether an update is being performed or is already concluded.

For example, a further processor (not shown) of the embedded system 401 can initialize the downloading of the update data and the update data can be conveyed to the central link shield 403 for further processing.

Furthermore, the central link shield 403 can support public key methods. In a public key method, the private key and the public key of the embedded system 401 are stored in the memory 408 of the central link shield 403. Furthermore, any certificates used for sign operations or encryption operations are also stored in the memory 408.

The central link shield 403 also provides roaming functionalities. Roaming is performed, for example, in accordance with the UMA (Unlicensed Mobile Access) specification. In this case, the central link shield 403 supports the data transmission between the embedded system 401 which, for example, is equipped as a mobile radio subscriber unit, and a UMC (UMA Network Controller). In this arrangement, the (public) IP (Internet Protocol) address of the embedded system 401 is stored in the memory 408 and is used as identification of the embedded system 401 from the point of view of the communication network used for the data transmission. Using the stored IP address and the authentication information of the embedded system 401, which is also stored in the memory 408, a secure tunnel or, respectively, an IP communication link can be set up. The IP address and the authentication information are stored, for example, immediately after a secure booting in a secure area of the memory 408, that is to say in an area of the memory 408 protected against unauthorized access. This makes it possible to accelerate the authentication and the setting up of a communication link based on the Internet protocol since the required information is stored in the memory 408 of the central link shield 403 and not called up from another memory, for example in a SIM (Subscriber Identity Module) card or a similar memory device.

In power management, the central link shield 403 can operate as Domain Policy Manager (DPM) as is not provided in conventional mobile devices. In its operation as DPM, the central link shield 403 collects all policies specific to the embedded system 401, that is to say rules which relate to power management, and deposits them in an area of the memory 408 to which the operating system of the embedded system 401 has access. Using the policies, the operating system is able to decide whether, for example, it should allow a request for a change in the power of a linked device, for example the modem 405, or should deny this since errors could possibly occur if the power is changed. For example, by using the policies, the operating system determines that a certain Quality of Service (QoS) must be maintained for a communication service used and, therefore, a minimum transmitting power and/or received power of one of the communication modules 404, 405, 406 must be maintained.

The central link shield 403 administers the policies and is supplied with corresponding information by the operating system and the linked devices, for example the communication modules 404, 405, 406 so that the policies are always up to date and, conversely, provides the policy information to the embedded system 401.

To accelerate the exchange of data between the application processor 402 and the communication module 404, 405, 406, the central link shield 403 also provides a flexible, dynamic, programmable bandwidth configuration for the communication links (computer buses), by means of which data are exchanged between the application processor 402 and the communication modules 404, 405, 406. In this way, bottlenecks in the data transmission can be eliminated and delays can be avoided as a result of which, due to the faster exchange of data between the application processor 402 and the communication modules 404, 405, 406, less electrical power is required which is provided, for example, by a battery of the embedded system 401.

With regard to scenarios such as UWB (Ultra Wide Band), minimum data throughput rates of 200 Mbit per second are provided. In power management and handover management (and the detection of hardware of the embedded system 401), the central link shield 403 supports UPnP (Universal Plug and Play) and has suitable plug-ins. Furthermore, the central link shield 403 monitors the status of the embedded system 401 (system status monitoring). Automatic authentication tasks are performed by the central link shield by means of applets, for example according to XML (Extended Markup Language). The central link shield 403 also has suitable plug-ins for dynamic reconfigurations. Furthermore, the central link shield 403 is informed about the operating system of the embedded system 401 (OOS).

Figure 5:
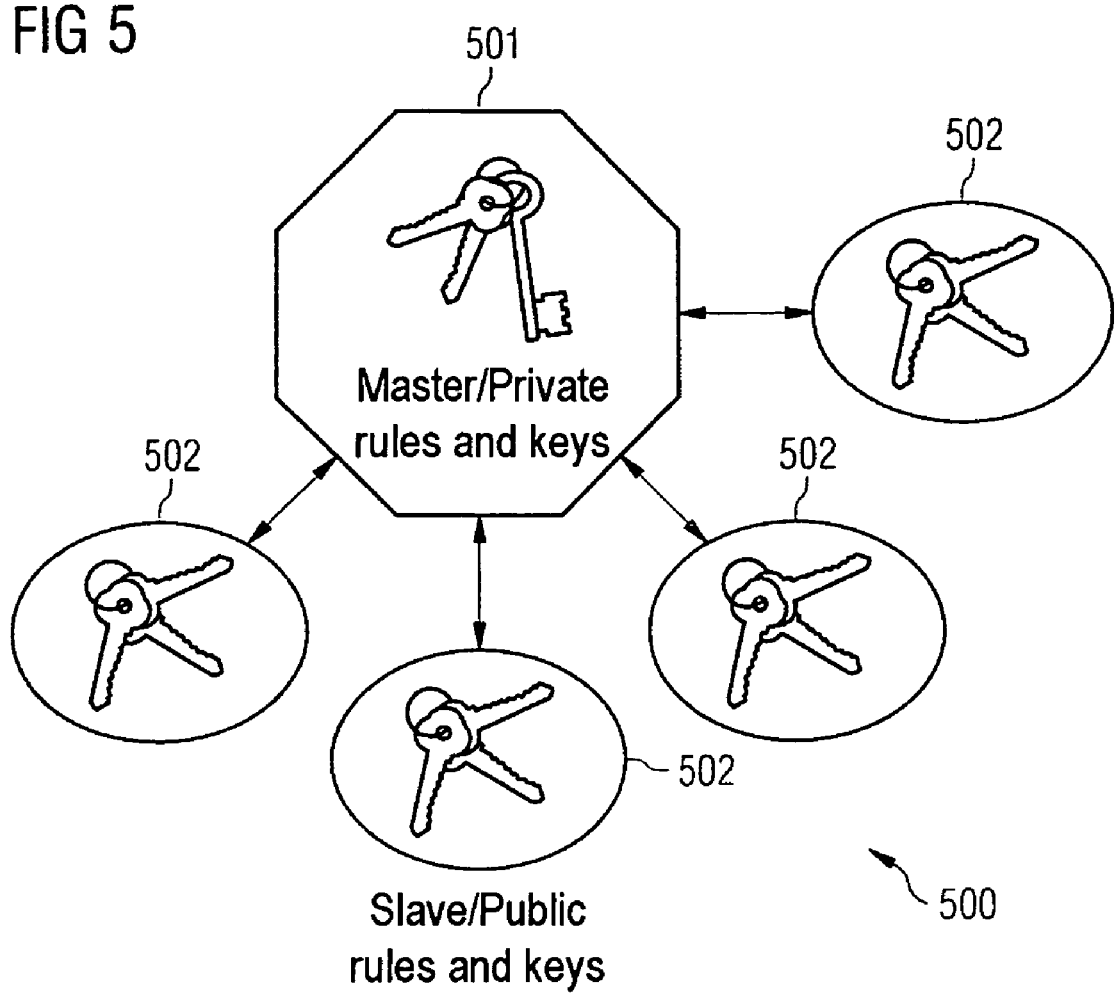
FIG. 5 shows the architecture of an encryption method according to an illustrative embodiment of the invention.

FIG. 5 shows the architecture 500 of an encryption method according to an illustrative embodiment of the invention.

A key server unit (master port) 501 illustratively determines the encryption system and distributes keys to be used in the encryption to a multiplicity of key client units (slave ports) 502. For example, the key server unit 501 conveys information to the key client units 502 which enable the key client units 502 to generate pairs of keys for PGP encryption.

The key server unit 501 can also handle authentication tasks in the encryption. One of the key client units 502, for example, corresponds to the embedded system 401 which is configured and controlled by the key server unit 501 as part of the encryption tasks.

Analogously, the policy server unit can provide rules which are to be used by the central link shields of a multiplicity of embedded systems for controlling the data traffic.

Figure 6:
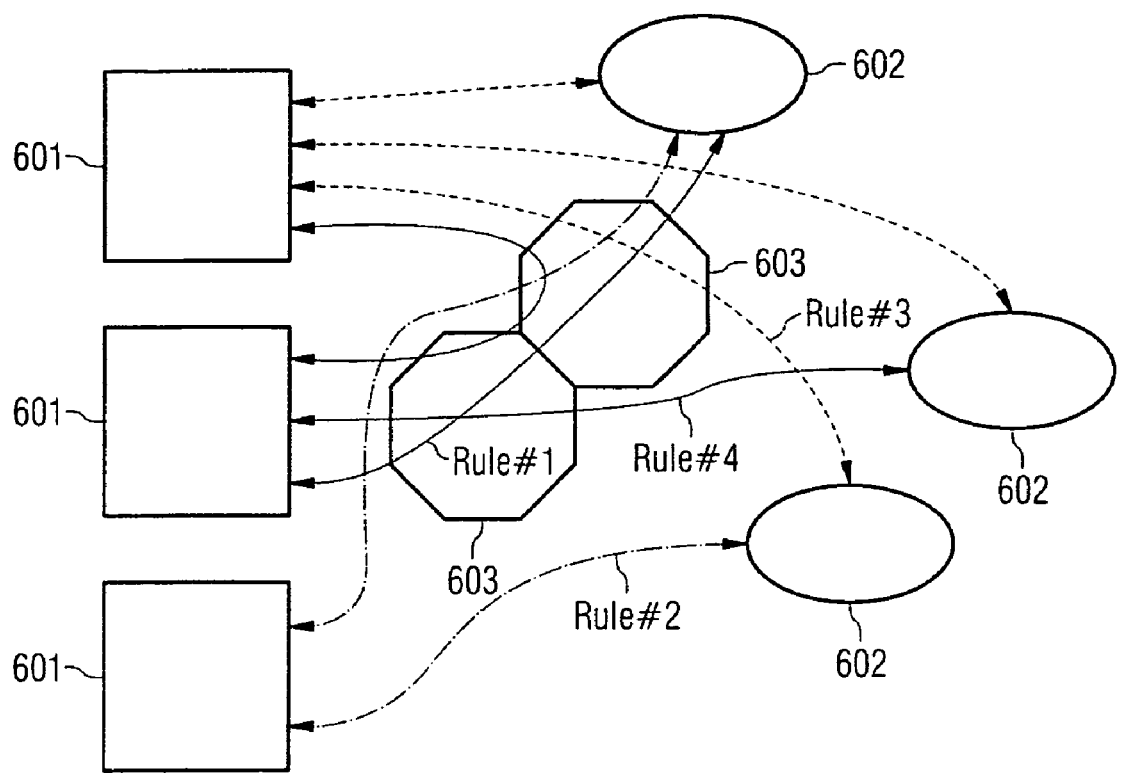
FIG. 6 illustrates the shared use of resources by a number of embedded systems.

FIG. 6 illustrates the shared use of resources by a number of embedded systems.

A multiplicity of embedded systems 601 accesses shared resources 602. The corresponding communication links are indicted by the arrows in FIG. 6. The access to the shared resources is controlled by the central link shields of the embedded systems 601. In the present example, a part of the communication links between the embedded systems 601 and the shared resources 602 is monitored by the central link shields which is indicated by hexagons 603 in FIG. 6.

Coupling a number of central link shields, which in each case control the utilization of shared resources (or the data traffic) according to rules, makes it possible to achieve a hierarchy of rules, illustratively a hierarchical network topology.

What is claimed is:

1. An embedded communication terminal, comprising:
    an application processor;
    a communication device; and
    an interface device having an interface processor and an interface memory, and being coupled to the application processor and the communication device, wherein the interface device by means of the interface memory temporarily stores, or by means of the interface processor processes, and forwards to the application processor data received by the communication device, and wherein the interface device by means of the interface memory temporarily stores, or by means of the interface processor processes, and forwards to the communication device for sending, data to be sent by the embedded communication terminal,
    wherein the communication device sends data from the embedded communication terminal, and receives and forwards data sent to the embedded communication terminal to the interface device, and
    wherein the interface device is a gateway protective shield for the entire communication of the application processor with units outside the embedded communication terminal.

2. The embedded communication terminal of claim 1, wherein by means of the interface memory the interface device temporarily stores, and by means of the interface processor processes, and forwards to the application processor, data received by the communication device.

3. The embedded communication terminal of claim 1, wherein the interface device by means of the interface memory temporarily stores, and by means of the interface processor processes, and forwards to the communication device for sending, data to be sent by the embedded communication terminal.

4. The embedded communication terminal of claim 1, wherein the interface device decrypts, and forwards to the application processor, encrypted data received by the communication device.

5. The embedded communication terminal of claim 1, wherein the interface device encrypts, and forwards to the communication device for sending, data to be sent encrypted by the embedded communication terminal.

6. The embedded communication terminal of claim 1, wherein the interface device stores data and, on a request for the data which is transmitted to the embedded communication terminal and received by the communication device, sends the data using the communication device in accordance with the request.

7. The embedded communication terminal of claim 1, wherein the embedded communication terminal comprises at least one further communication device, and
wherein the interface device enables sending and receiving using the communication device and the at least one further communication device.

8. The embedded communication terminal of claim 1, wherein the interface device performs power management tasks or handover tasks.

9. The embedded communication terminal of claim 8, wherein the interface device performs power management tasks and handover tasks.

10. The embedded communication terminal of claim 1, wherein the embedded communication terminal is a mobile radio subscriber unit.

11. An embedded communication terminal, comprising:
an application processor;
a communication device; and
an interface device having an interface processor and an interface memory, and being coupled to the application processor and the communication device, wherein the interface device stores or processes and forwards to the application processor, data received by the communication device, and wherein the interface device stores or processes and forwards to the communication device for sending, data to be sent by the embedded communication terminal;
wherein the communication device sends data from the embedded communication terminal, and receives and forwards data sent to the embedded communication terminal to the interface device,
wherein the interface device stores data and, on a request for the data which is transmitted to the embedded communication terminal and received by the communication device, sends the data using the communication device in accordance with the request, and
wherein the interface processor is a gateway protective shield for the entire communication of the application processor against units outside the embedded communication terminal.

12. The embedded communication terminal of claim 11, wherein the interface device decrypts, and forwards to the application processor, encrypted data received by the communication device.

13. The embedded communication terminal of claim 11, wherein the interface device encrypts, and forwards to the communication device, data to be sent encrypted by the embedded communication terminal.

14. The embedded communication terminal of claim 1, wherein the interface device provides communication between the application processor and the units outside the embedded communication terminal in accordance with a plurality of protocols.

15. The embedded communication terminal of claim 1, wherein the interface device detects the operating system of the embedded communication terminal.

16. The embedded communication terminal of claim 1, wherein the interface device performs power management tasks.

17. The embedded communication terminal of claim 1, wherein the interface device comprises plug-ins for performing reconfigurations.

* * * * *